May 31, 1949.  E. F. BRITTEN, JR  2,471,930
SHIP'S LOG TRANSMISSION REGULATOR
Filed Feb. 4, 1944
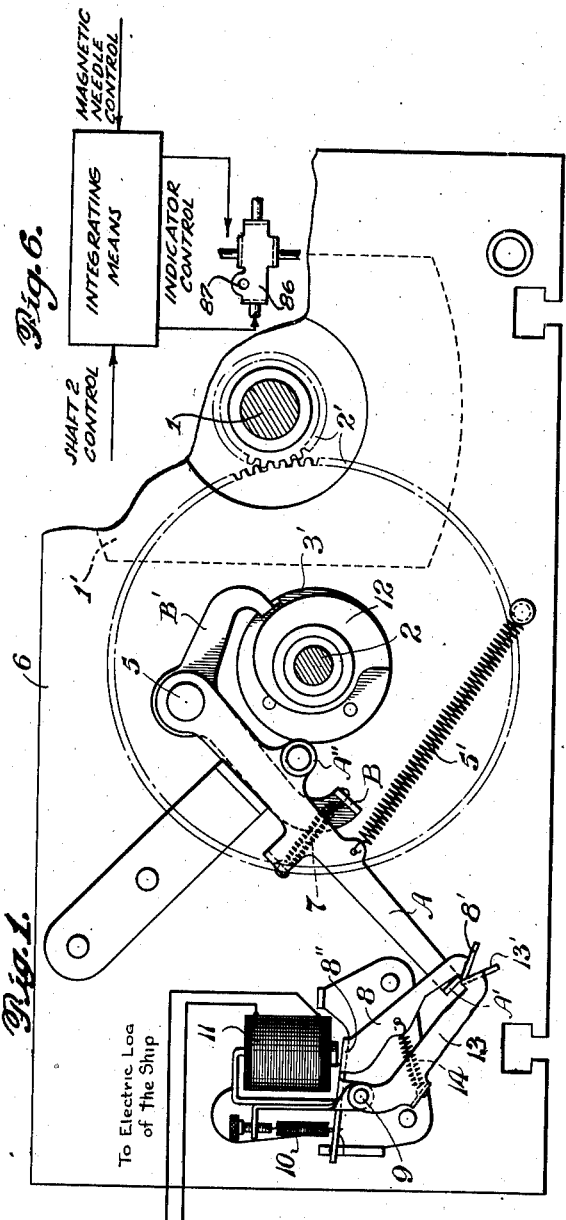
Inventor
Edwin F. Britten, Jr.
By C. W. Anderson & Son.
Attorneys Patented May 31, 1949

2,471,930

UNITED STATES PATENT OFFICE 2,471,930

SHIP'S LOG TRANSMISSION REGULATOR

Edwin F. Britten, Jr., Short Hills, N. J., assignor to Monroe Calculating Machine Company, Orange, N. J., a corporation of Delaware Application February 4, 1944, Serial No. 521,090

3 Claims. (Cl. 73—178)

The invention relates to means for regulating the rate of advance of the drive shaft of a power driven instrument in accordance with the frequency of the impulses emitted from an electric log during movement of a marine vessel.

The instrument to be driven may be of the nature of an odometer, for plotting the course of a ship upon a chart; a heading recorder, for showing the deviations from a predetermined course, or any other device in which the rate of travel forms a component of the desired indication. There is employed a motor rotating at a constant speed, a mechanical cyclic clutch interposed in the drive from said motor, and clutch control means interposed between said clutch and an electro-magnet wired to the circuit making and breaking devices of the electric log of a marine vessel to render the clutch effective when the circuit is made and the electro-magnet energized and to render the clutch ineffective when the circuit is broken and the electro-magnet de-energized, and it is an object of the invention to provide means whereby the drive will make but one rotation for each magnet-energizing impulse from said log, this being necessary because the propeller of the vessel may be rotated at varying speeds, and at lower speeds the electric log impulses could be prolonged over an interval of time greater than that taken for the cycle of the drive.

In carrying out the invention, obviously the timing should be such as to provide for one cycle of the drive for each magnet-energizing impulse from the electric log of the vessel when the propeller thereof is rotating at high speed, and means are provided for rendering the cyclic clutch ineffective at the end of the cycle irrespective of prolongations of said magnet-energizing impulses which would occur when the propeller is rotating at lower speeds.

The invention consists in the novel construction and combinations of parts as hereinafter set forth in the claims.

In the accompanying drawings,

Figure 1 is a side elevation of the means of this invention for rotating the driven shaft from the motor, under control of the impulses from the electric log of the ship, with the parts in normal position.

Figure 2 is a view similar to Figure 1, partly broken away, showing the parts in the positions assumed upon energization of the electro-magnet.

Figure 3 is a section of certain parts on the line 3—3, Figure 2, partly broken away.

Figure 4 is a detail sectional view, showing one member of the compound lever in engagement with the pawl to render the clutch normally ineffective.

Figure 5 is a view similar to Figure 4, showing this member of the compound lever released and riding upon the periphery of the annular clutch casing, the clutch being effected.

Figure 6 is a diagrammatic view showing the indicator or stylus and the means for controlling its movement over a chart with respect to the device of this application.

In these drawings, inasmuch as the operation or functioning of the invention depends upon the particular means provided for rotating the driven shaft from a motor, under control of the impulses from the electric log of the vessel, the showing is restricted to such means.

In these drawings, a drive shaft, designated 1, is rotated by motor 1', constantly at the same rate of speed, a driven shaft 2 having gearing connection 2' with said drive shaft, a mechanical clutch being interposed between the drive and driven shafts, said clutch having a ratchet wheel 3, fast upon the hub of one of the gears 2' and constituting the fast member of the clutch, and an annular casing 3' fast upon the driven shaft and provided with a spring-urged pawl lever 4, fulcrumed at 4' and with said casing constituting the loose member of the clutch, said pawl lever being adapted to engage said ratchet wheel to render the clutch effective.

A compound lever constituting a clutch detent has a member A, fulcrumed at 5 to the stationary framing 6, and provided with a spring-urging connection 5' with said framing; and a member B, also fulcrumed at 5, and having a spring-urging connection 7 with said member A. A latch lever 8, is fulcrumed at 9 to the stationary framing, the tail arm of said latch lever having a spring-urging connection 10 with said framing, said latch lever having a lower offset free end latching portion 8' engaging the lower offset free end A' of the member A of the clutch detent lever to maintain said member A retracted against the tension of its spring 5' and to maintain one arm B" of the member B (through the medium of spring 7) in engagement with said pawl lever 4 to retract the latter against the tension of its spring 4" and render the clutch normally ineffective. The casing 3' is provided with a circumferential slot 3" through which arm B' of member B normally extends to contact pawl lever 4 for the above named purpose.

The latch 8 includes an armature 8" for an electro-magnet 11, wired to the known circuit making and breaking means of the electric log of the vessel, whereby upon energization of said magnet the latch will be retracted against the tension of its spring to release the member A of the clutch detent lever and (through the medium of springs 5 and 7) retract the member B of said detent lever from engagement with said pawl lever 4 to render the clutch effective, the arm B' of the member B being thereupon engaged by and riding upon the periphery of the casing 3' of the clutch to maintain the clutch effective throughout its cycle of rotation, irrespective of deenergization of said magnet during the cycle.

A snail cam 12 fast upon the shaft 2, engages a roller A" of the clutch detent lever member A to restore said member A to normal position during said cycle, said latch 8 being by its spring 10 restored to normal position in engagement with the restored member A in the event the electro-magnet is deenergized at the time when roller A" is lifted to the high portion of cam 12, the latch acting through said spring connection 7 to hold member B of the clutch detent lever in position to engage with said pawl lever 4 to render the clutch again ineffective at the end of the cycle.

A normally idle secondary latch lever 13 is fulcrumed also at 9, and has a spring-urging connection 14 with the primary latch 8, said secondary latch having a lower offset free and latching portion 13' adapted to engage the lower end A' of the member A of the clutch detent lever, as it is lifted by cam 12, in case the electro-magnet is energized and latch 8 held retracted thereby at such time. Upon de-energization of the electro-magnet, latch 8, acting under the influence of spring 10, will strike and restore the secondary latch 13. Normally the lower latching portion 13' of the secondary latch, urged by the spring 14, is pressed against the lower lateral face of the offset lower end A' of the member A of the clutch detent lever with portion 13' extending above the lower latching portion 8' of the primary latch. When the electro-magnet is de-energized at the time the secondary latch 13 is engaged with said member A, the latter upon release thereof by said secondary latch 13 will be immediately engaged by the primary latch 8 to maintain it in normal position.

The use of the secondary latch provides against any possible continuous running of shaft 2, which would have the effect of disturbing the proper rate of advance of the shaft.

The progressive movement or rate of travel of the vessel is measured by the drive of its propeller shaft transmitted through known circuit making and breaking means of the electric log of the vessel to the shaft 2 by the device of this application. Rotation of shaft 2 is transmitted through suitable gearing (not shown) to means for integrating the different directional components, such as north or south and east or west, of the progressive movement of the vessel, said integrating means being disclosed in the pending application for patent of L. P. Crosman, Ser. No. 491,260, filed June 16, 1943, now Patent 2,437,506. The varying movement of the magnetic needle of the vessel is measured by the rotary movement of an annular plate, driven by an electric motor, means controlled by said needle being interposed between the needle and said motor to reverse the motor as the needle reverses as disclosed in my Patent 2,325,365, dated July 27, 1943, and in my pending application for patent Ser. No. 491,257, filed June 16, 1943, now Patent 2,455,219.

In the case of an odograph whereby a chart is plotted to show the course of a vessel, a holder 86 for a stylus or indicator 87 has its movement over the chart controlled by means shown diagrammatically in Figure 6.

I claim:

1. In a device of the character described, a drive shaft, a driven shaft, a constantly rotating motor for rotating said drive shaft, a cyclic clutch interposed between the drive and driven shafts, said clutch having a ratchet wheel fast upon the drive shaft and an annular casing fast upon the driven shaft and provided with a spring-urged pawl adapted to engage said ratchet wheel to render the clutch effective, and means for rendering said clutch successively effective and ineffective to rotate the driven shaft intermittently comprising a clutch-detent compound-lever one member of which has a spring-urging connection with the stationary framing and the other member of which has a spring-urging connection with the first-named member and engagement with said pawl to render the clutch normally ineffective, a latch engaging the first-named member to maintain it in normal position with said other member engaged with said pawl, and an electro-magnet wired to the circuit making and breaking means of the electric log of a marine vessel, said latch including an armature for said magnet and being released upon energization of said magnet to release said pawl and render the clutch effective, said other member having riding engagement with the periphery of said casing throughout the clutch cycle and reengagement with said pawl at the end of the cycle to render the clutch again ineffective.

2. In a device of the character described, a drive shaft, a driven shaft, a constantly rotating motor for rotating said drive shaft, a cyclic clutch interposed between the drive and driven shafts, said clutch having a ratchet wheel fast upon the drive shaft and an annular casing fast upon the driven shaft and provided with a spring-urged pawl adapted to engage said ratchet wheel to render the clutch effective, and means for rendering said clutch successively effective and ineffective to rotate the driven shaft intermittently comprising a clutch-detent compound lever one member of which has a spring-urging connection with the stationary framing and the other member of which has a spring-urging connection with the first-named member and engagement with said pawl to render the clutch normally ineffective, a latch engaging the first-named member to maintain it in normal position with said other member engaged with said pawl, and an electro-magnet wired to the circuit making and breaking means of the electric log of a marine vessel, said latch including an armature for said magnet and being released upon energization of said magnet to release said pawl and render the clutch effective, said other member having riding engagement with the periphery of said casing throughout the clutch cycle and re-engagement with said pawl at the end of the cycle to render the clutch again ineffective, a cam upon the driven shaft for restoring said detent to normal position during the clutch cycle, and a secondary latch engaging the restored detent to maintain the same in normal position engaged with said pawl to render the clutch ineffective at the end of the cycle irrespective of deenergization of said magnet at such time.

3. In a device of the character described provided with an indicator, wherein the rate of travel of a marine vessel forms one component of the desired indication, a drive shaft, a driven shaft, a motor rotating at a constant speed for rotating said drive shaft, a cyclic clutch the members of which are respectively mounted upon the drive and driven shafts to rotate therewith, an electro-magnet wired to the circuit making and breaking devices of the electric log of said vessel, and means for rendering said clutch successively effective and ineffective and for rendering said clutch ineffective at the end of its cycle irrespective of prolongations of magnet energizing impulses from said log to give the driven shaft but one rotation for each impulse from said log comprising a compound lever engaging one of the clutch members to render the clutch normally ineffective and a compound latch engaging said lever to maintain it in normal position, said latch having an armature for said magnet and being controlled thereby, said latch comprising a normally idle secondary latch for engaging said lever in the event the magnet remains energized at the end of a clutch cycle due to prolongation of an impulse from said log.

EDWIN F. BRITTEN, Jr.

REFERENCES CITED

The following references are of record in the file of this patent:

UNITED STATES PATENTS

| Number | Name | Date |
| --- | --- | --- |
| 1,640,871 | Ballard | Aug. 30, 1927 |
| 2,049,690 | Cunningham | Aug. 4, 1936 |

FOREIGN PATENTS

| Number | Country | Date |
| --- | --- | --- |
| 348,832 | Great Britain | May 21, 1931 |

Certificate of Correction

May 31, 1949.

Patent No. 2,471,930.

EDWIN F. BRITTEN, Jr.

It is hereby certified that error appears in the printed specification of the above numbered patent requiring correction as follows:

Column 4, line 74, claim 2, for "deenergization" read *energization*;

and that the said Letters Patent should be read with this correction therein that the same may conform to the record of the case in the Patent Office.

Signed and sealed this 1st day of November, A. D. 1949.

[SEAL]

THOMAS F. MURPHY,
*Assistant Commissioner of Patents.*